United States Patent [19]
Crabb

[11] Patent Number: 5,785,395
[45] Date of Patent: Jul. 28, 1998

[54] CUSHIONED ROLLER FOR A BELTED UNDERCARRIAGE

[75] Inventor: Elmer R. Crabb, Granbury, Tex.

[73] Assignee: Caterpillar Inc., Peoria, Ill.

[21] Appl. No.: 702,827

[22] Filed: Aug. 23, 1996

[51] Int. Cl.[6] .................................................. B62D 55/104
[52] U.S. Cl. ........................... 305/138; 305/124; 301/137; 295/36.1; 180/9.54
[58] Field of Search .................. 305/124, 129, 305/136, 138, 141, 199; 301/124.1, 126, 131, 137, 132; 295/7, 11, 36.1; 152/40, 42; 180/9.1, 9.5, 9.52, 9.54, 9.62; 74/607

[56] References Cited

U.S. PATENT DOCUMENTS

| | | | |
|---|---|---|---|
| 1,438,859 | 12/1922 | Rimailho . | |
| 2,355,456 | 9/1944 | Macbeth | 267/21 |
| 2,393,993 | 2/1946 | Knox | 305/138 X |
| 2,403,362 | 7/1946 | Hait et al. | 267/21 |
| 2,493,023 | 1/1950 | Pointer | 301/132 X |
| 2,747,918 | 5/1956 | Blackwood | 395/36.1 |
| 2,775,492 | 12/1956 | Wirkkala | 305/10 |
| 3,147,048 | 9/1964 | Johnson et al. | 308/18 |
| 3,275,387 | 9/1966 | Hedges | 305/138 |
| 3,578,822 | 5/1971 | Slemmons | 305/24 |
| 3,620,578 | 11/1971 | Fix | 305/11 |
| 3,799,625 | 3/1974 | Statz | 305/24 |
| 4,171,027 | 10/1979 | Seit et al. | 180/9.54 |
| 4,844,195 | 7/1989 | Deli et al. | 180/9.5 |
| 4,893,687 | 1/1990 | Simmons | 305/138 X |
| 5,040,855 | 8/1991 | Diekevers | 305/24 |
| 5,131,731 | 7/1992 | Johnson | 305/56 |
| 5,161,866 | 11/1992 | Johnson | 305/24 |

FOREIGN PATENT DOCUMENTS

| 1168281 | 12/1958 | France | 301/137 |
|---|---|---|---|

*Primary Examiner*—Russell D. Stormer
*Attorney, Agent, or Firm*—Larry G. Cain

[57] ABSTRACT

Rollers used in the past have usually been cushioned by the attachment system. The present cushioned roller includes the cushioned member being an integral part of the roller. For example, the unique roller includes a pair of individual shell portions positioned at the ends of a shaft. The shaft and a collar which is mounted to a chassis includes a cushioning member positioned therebetween the shaft and the collar. The pair of individual shell portions are separately rotatable about the shaft and the rollers are isolated from the chassis and the rollers can osculate about the chassis. Thus, the roller is free to isolate about the chassis and each of the pair of individual shell portions are in contact with each of the inner portion and the outer portion of the inner surface of the belts. Furthermore, impact loads are absorbed by the cushioning member and increase the longevity of the roller and provide a better ride for the operator.

16 Claims, 4 Drawing Sheets

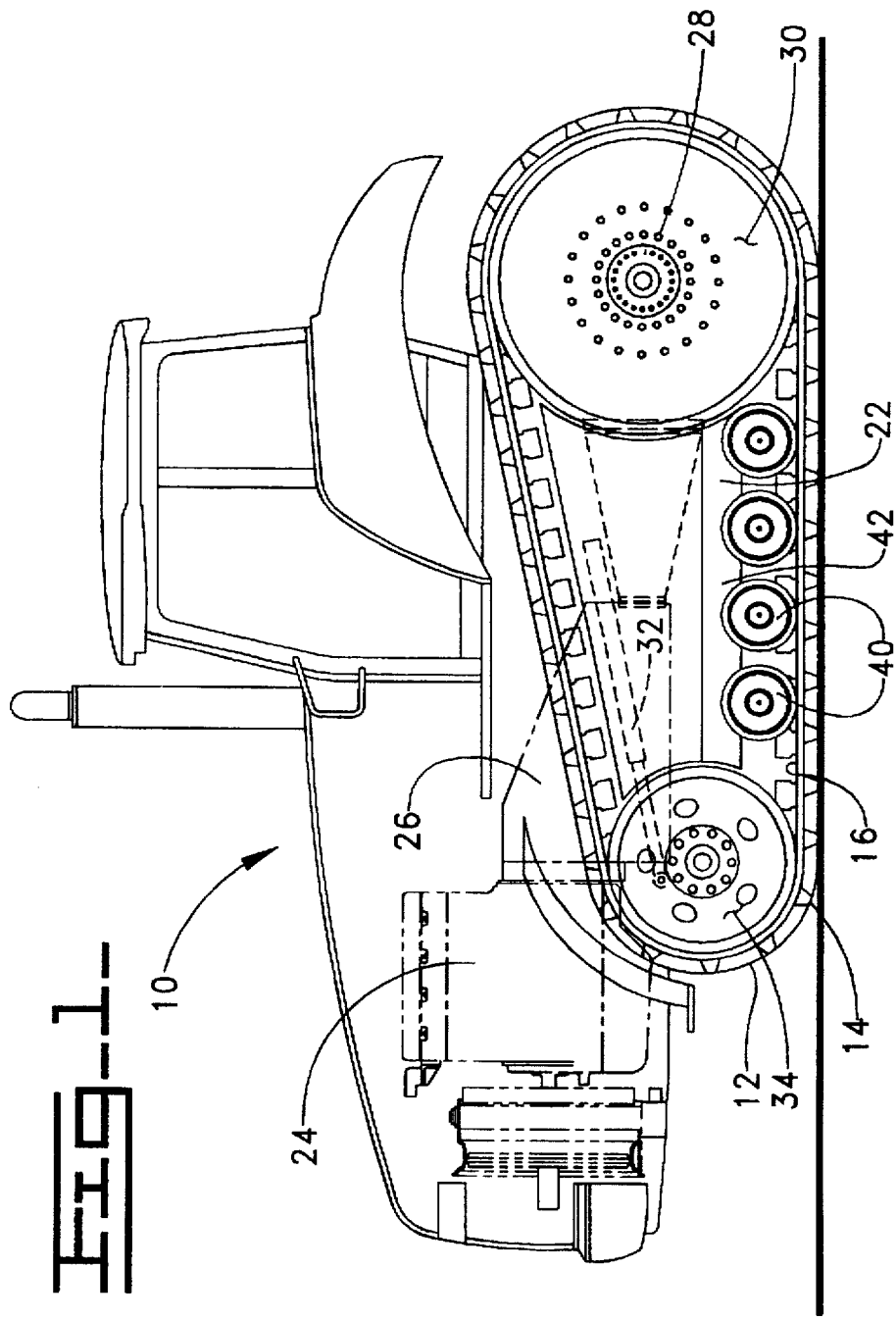

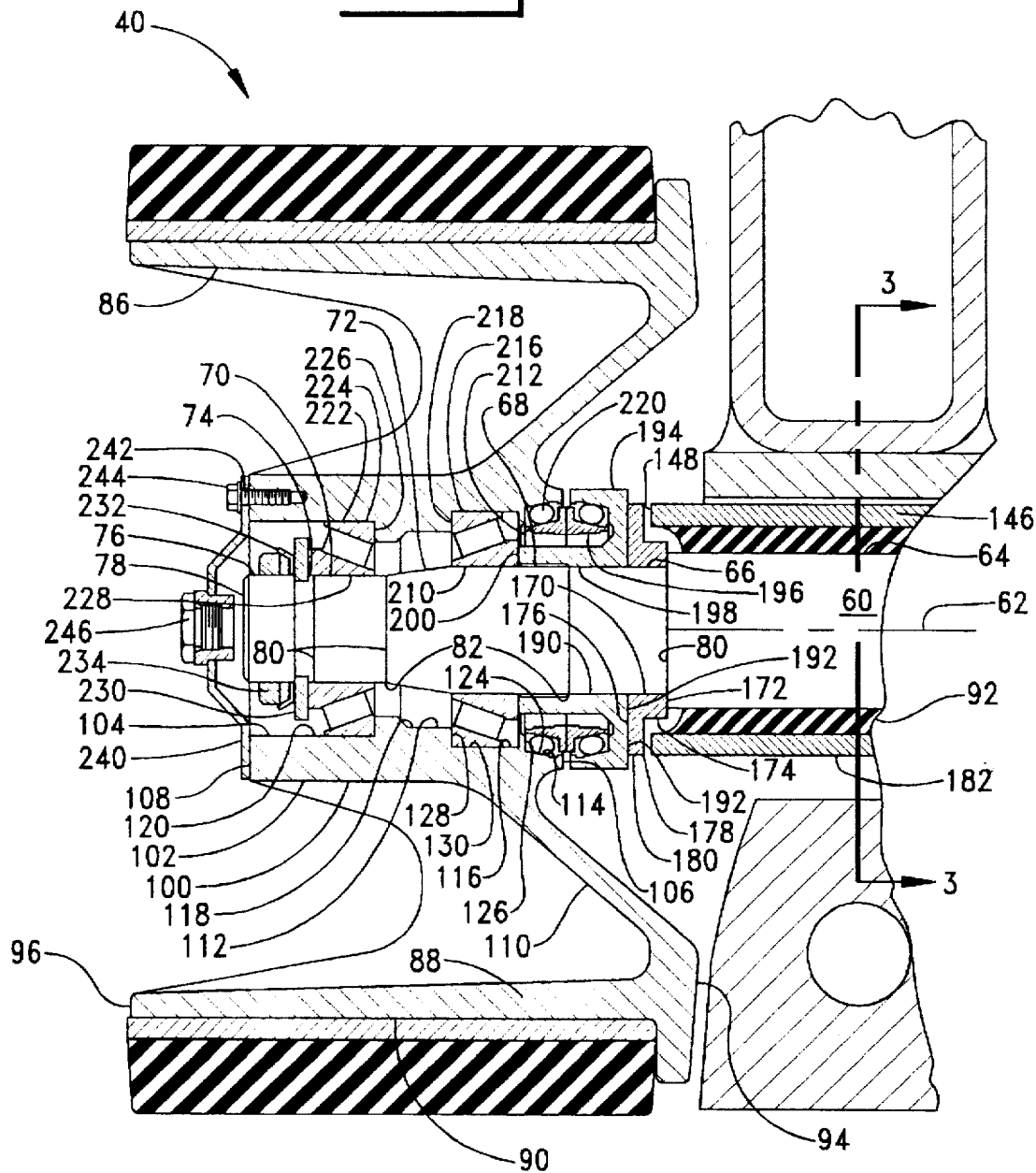
Fig_2a_

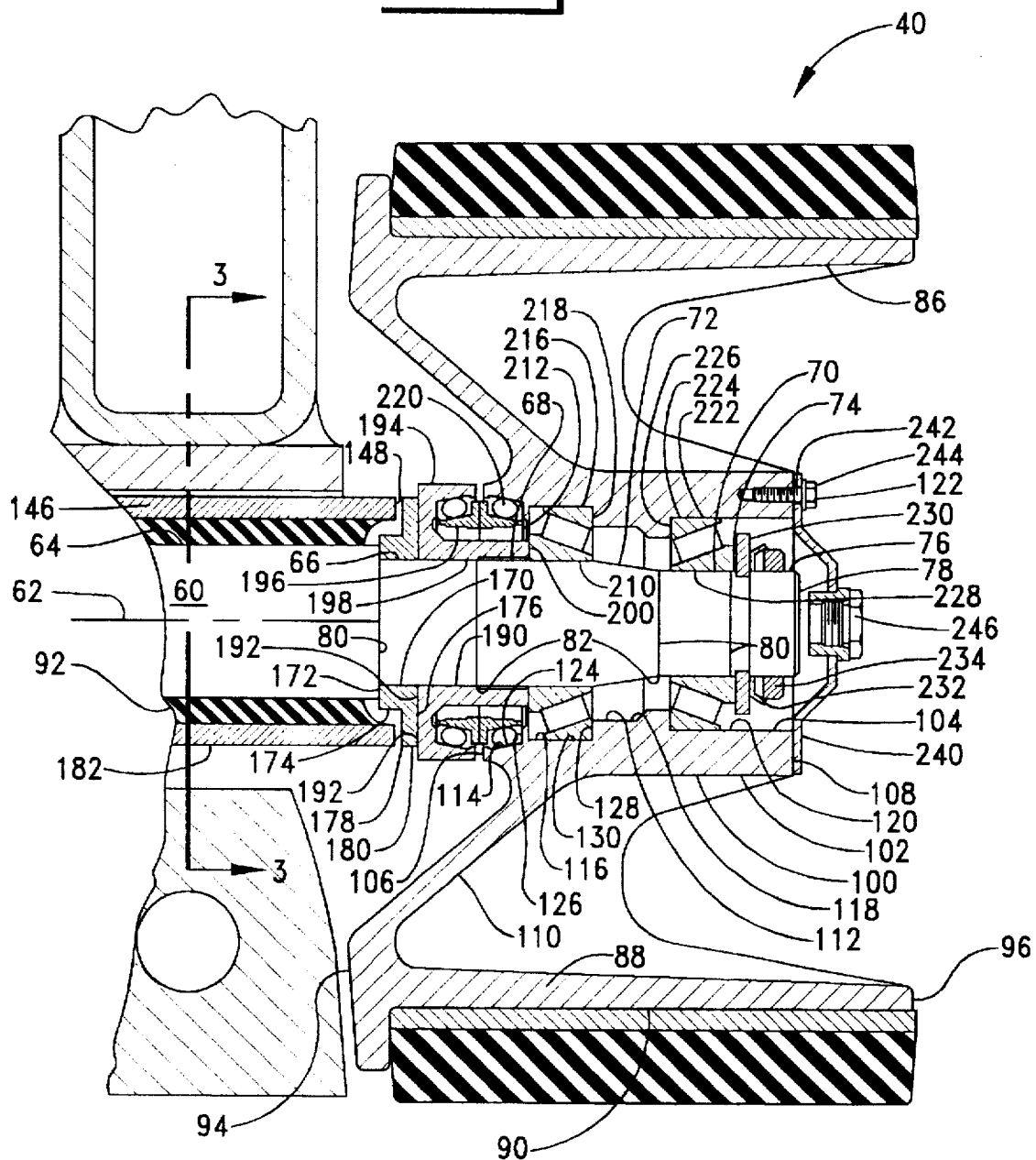
Fig_2b_

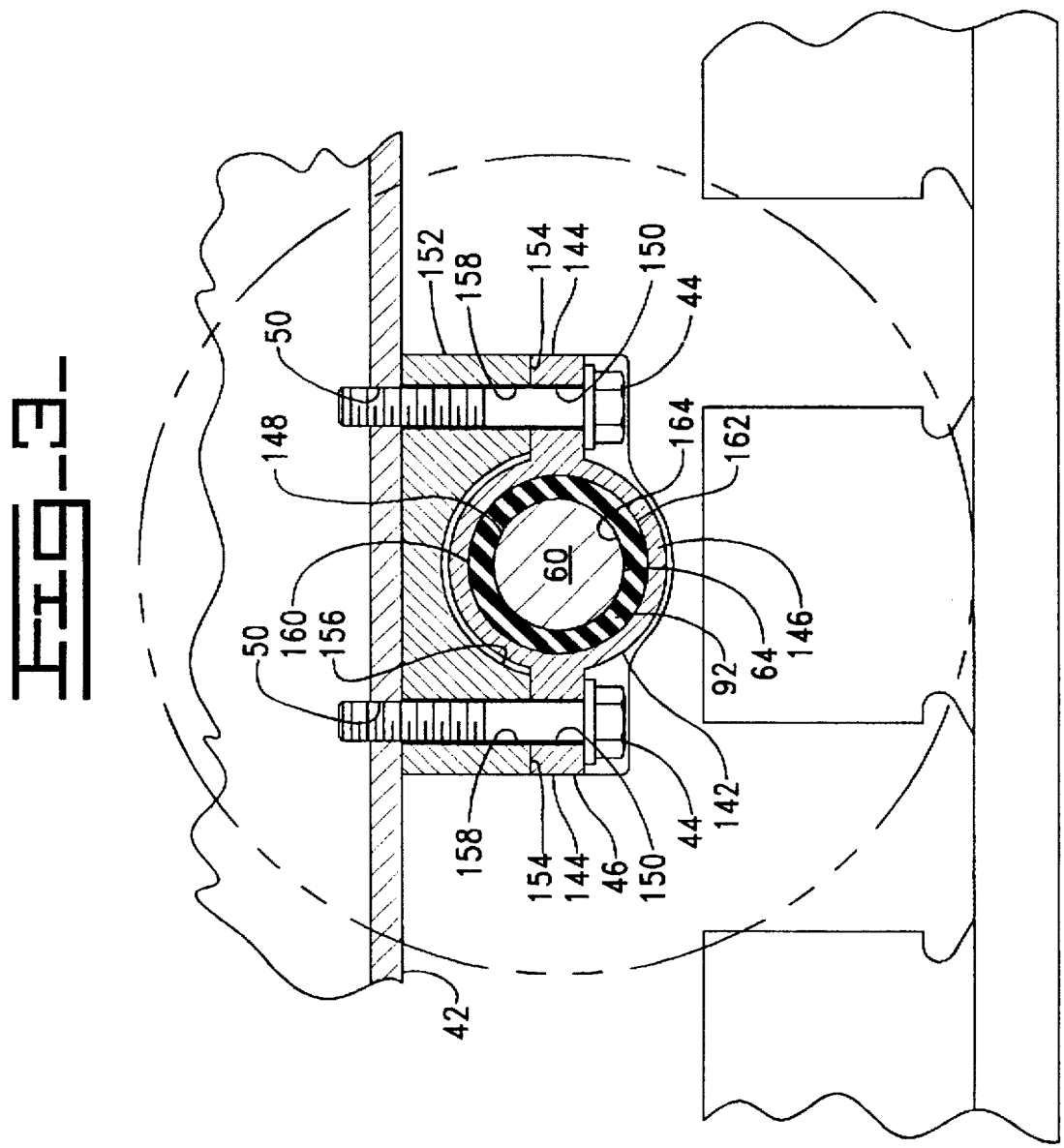

5,785,395

CUSHIONED ROLLER FOR A BELTED UNDERCARRIAGE

TECHNICAL FIELD

This invention relates generally to a roller for supporting a belted undercarriage of a belted work machine and more particularly to a cushioned roller having a metallic shaft supported by a cushioning member and positioned within a collar being attached to the belted work machine.

BACKGROUND ART

The popularity and nearly universal acceptance of wheel propulsion systems rather than track systems in agricultural use has stemmed primarily from the past track system's relatively higher noise levels, higher initial cost, lower maximum travel speed, and inability to transport itself on improved road surfaces without inflicting unacceptable damage.

Present day systems have overcome the majority of these objections by utilizing a propulsion system in which a continuous flexible rubber belt is entrained about a pair of wheels. Problems encountered in actually reducing such belt system to practice include how to drive such belt with the entrained wheels, how to maintain structural integrity of the belt, rollers and wheels, how to entrain the belt in lateral alignment with the wheels when the wheels are subject to large lateral loads, how to provide long life for the belt, rollers and wheels, and how to accommodate flexing of the belt and maintaining the foot print of the belt in contact with the under footing and maintaining the lowest compaction between the work machine and the ground.

The present invention is directed to overcome one or more of the problems as set forth above.

DISCLOSURE OF THE INVENTION

In one aspect of the invention, a cushioned roller is comprised of a shaft defining an axis and a pair of ends being spaced along the axis and a cylindrical surface being axially centered on the shaft. A pair of individual shell portions are rotatably attached near each of the ends of the shaft and are separated by the cylindrical surface. A collar is positioned about the cylindrical surface and a cushioning member is interposed the collar and the cylindrical surface of the shaft.

In another aspect of the invention, a work machine has a rubber belted track system. The rubber belted track system is attached to a chassis of the work machine and the rubber belted track system has a pair of endless belts defining an inner surface having an inner portion and an outer portion. The pair of endless belts are driven by a drive wheel and an idler wheel is connected to the chassis. The pair of endless belts are tensioned between the drive wheel and the idler wheel by a tensioning means. The work vehicle is comprised of a plurality of cushioned rollers attached to the chassis and rotatably contacting the inner surface of the pair of endless belts. The plurality of cushioned rollers include a shaft defining an axis, a pair of ends being spaced along the axis and a cylindrical surface axially centered on the shaft. The plurality of cushioned rollers include a pair of individual shell portions rotatably attached near each of the ends of the shaft and separated by the cylindrical surface. Individual ones of the pair of individual shell portion being in contacting relationship with at least one of the inner portion and the outer portion of the inner surface of the pair of endless belts. A collar being positioned about the cylindrical surface and being attached to the chassis. And, a cushioning member being interposed the collar and the cylindrical surface of the shaft.

BRIEF DESCRIPTION OF THE DRAWINGS

FIG. 1 is a side elevational view of the work machine embodying the present invention;

FIG. 2 is an enlarged sectional view of a cushioned roller of the present invention; and FIG. 3 is an enlarged sectional view of a mounting portion of the cushioned roller attached to the work machine as taken along line 3—3 of FIG. 2.

BEST MODE FOR CARRYING OUT THE INVENTION

Referring to FIG. 1, a work machine 10 is shown having a rubber belted track system 12. The belted track system 12 utilizes a pair of endless belts 14, only one shown, defining an inner surface 16 having an inner portion 18 and an outer portion 20 and being positioned on the sides of the work machine. The work machine includes a chassis 22, an engine 24, a transmission 26 and final drive 28 for driving the belted track system 12 in a conventional manner. As an alternative, the conventional system could be of any scope such as a hydrostatic drive system.

In this application, each of the endless tracks 14 is frictionally driven by a drive wheel 30 being powered by the engine 24 in a conventional manner. In as much as the pair of endless tracks 14 are substantially structurally and operatively identical, further reference will be made to only a single side of the belted drive system 12. The endless track 14 is tensioned on the drive wheel 30 by a conventional tensioning system 32 including an idler wheel 32. Additionally, the tensioning system 32 as an alternative, could include a recoil mechanism. In this application, the drive wheel 30 is positioned near the back of the work machine 10 and the idler wheel 34 is positioned toward the front of the work machine 10. A conventional suspension system operatively attaches the idler wheel 34, the drive wheel 30 and the chassis 22.

As further shown in FIGS. 1 and 3, the endless track 14 is tensioned between the drive wheel 30 and the idler wheel 34 and has a plurality of cushioned rollers 40 therebetween being attached to a roller frame 42 of the chassis 22 in a conventional manner such as by a plurality of bolts 44 extending through a collar 46 of respective ones of the plurality of cushioned rollers 40 and threadedly engaged with corresponding ones of a plurality of threaded holes 50 within the roller frame 42. As an alternative, the plurality of cushioned rollers 40 could be attached to a bogie system being attached to the chassis directly or through the idler mechanism.

Referring to FIG. 2, each of the plurality of cushioned roller 40 includes a cylindrical shaft 60 defining an axis 62 and having a generally stepped configuration defining a first cylindrical surface 64 having a major diameter and a preestablished length. A pair of second cylindrical surfaces 66 axially extend from the first cylindrical surface 64 in opposite directions and have a diameter being less than that of the major diameter and a preestablished length. A pair of third cylindrical surfaces 68 axially extend from corresponding ones of the pair of second cylindrical surfaces 66 and have a diameter being less than that of the diameter of the second cylindrical surface 66 and a preestablished length. And, a pair of fourth cylindrical surface 70 extend in opposite directions away form the third cylindrical surfaces 68 and has a diameter being less that of the diameter of the third cylindrical surface 68 and a preestablished length. A pair of transition portions 72 are interposed the respective ones of the pair of third cylindrical surface 68 and the pair of fourth cylindrical surface 70. An undercut 74 is interposed the fourth cylindrical surface 70 and a threaded portion 76 positioned at each of a pair of ends 78. The interface between respective ones of the plurality of cylindrical surfaces 64, 66, 68, 70 and transition portions 72 define a plurality of edges 80 blendingly connected by a corresponding radius or chamfer 82. The cylindrical shaft 60 in this application is a solid shaft but as an alternative could have a hollow configuration or be formed to provide the stepped configuration or as a further alternative could be made of individual segments attached to form the cylindrical shaft 60.

Assembled about the cylindrical shaft 60 is a pair of individual shell portions 86 having an axis being symmetrical with the axis 62 of the cylindrical shaft 60. Each shell portion 86 includes an outer cylindrical housing 88 spaced from the axis 62 a predetermined distance and defining an outer peripheral surface 90 which in this application has a elastomeric material 92, such as rubber, attached thereabout. The outer cylindrical housing 88 defines a first end 94 positioned inwardly of the respective one of the pair of ends 78 of the shaft 60 and a second end 96 positioned outwardly of the same respective one of the pair of ends 78. Spaced from the axis of the shell portion 86 a predetermined distance is an inner cylindrical housing 100 being positioned radially inward of the outer cylindrical housing 88. The inner cylindrical housing 100 defines an outer cylindrical peripheral surface 102 and an inner cylindrical peripheral surface 104 being interposed a first end 106 and a second end 108. Extending from the first end 92 of the outer cylindrical housing 88 to a position intermediate the first and second ends 106, 108 of the inner cylindrical housing 100 and being attached to the outer cylindrical peripheral surface 102 is a connecting rib 110. The inner cylindrical peripheral surface 104 includes a plurality of machined surfaces 112. For example, progressing from the first end 106 to the second end 108 is a sealing portion 114, a first bearing portion 116, a spacer portion 118 and a second bearing portion 120. The second end 108 of the inner cylindrical housing 100 has a plurality of threaded holes 122 positioned therein. The first sealing portions 114 includes a first sealing surface 124 positioned adjacent the first end 106 and having a generally arcuate cross-sectional configuration and a second sealing surface 126 being interposed the first sealing surface 114 and the first bearing portion 116. The first and second bearing surfaces 116 120 each include a vertical portion 128 being adjacent the spacer portion 118 and a generally horizontal portion 130 interposed the vertical portion 128 and the respective first and second ends 106, 108.

As further shown in FIG. 3, the collar 44 is positioned about the first cylindrical surface 64 of the shaft 60. The collar 44 includes a cap 142 having a pair of supports 144 attached to a cylindrical housing 146 which is positioned about the shaft 60. The cylindrical housing 146 defines an axis extending between a pair of end 148 being spaced apart a preestablished distance. The axis is symmetrical with the axis 62 of the shaft 60. The pair of supports 144 each have a clearance hole 150 therein. Positioned between the collar 44 and the chassis 16 is a saddle 152 having a pair of tabs 154 in contacting relationship with a respective one of the pair of supports 144 and a recessed portion 156 being positioned about the cylindrical housing 146. Each of the pair of tabs 154 includes a clearance hole 158. The supports 144, in this application, are centered along the axis of the cylindrical housing 146. Interposed the shaft 60 and the cylindrical housing 146 is the cushioning member 160. The cushioning member 160 defines an outer surface 162 and, in this application, is made of a rubber material being attached to the cylindrical housing 146 such as by a glue. An inner surface 164 of the cushioning member 148 is positioned about the first cylindrical surface 64 so that the cushioning member 160 is compressively positioned between the shaft 60 and the collar 44 in the assembled condition.

As further shown in FIG. 3, a pair of shims 170 having a "L" configuration has a first abutting end 172 which makes up a portion of a horizontal leg 174 of the "L" and a second abutting end 176 makes up a portion of a vertical leg 178 of the "L". The shim 170 is positioned about the shaft 60 and the first abutting end 172 is placed in abutting relationship with the edge 80 between the first cylindrical surface 64 and the pair of second cylindrical surfaces 66. A portion of the horizontal leg 174 is axially positioned radially within the cylindrical housing 146 and an extremity 180 of the vertical leg 178 is generally radially aligned with an outer extremity 182 of the cylindrical housing 146. A pair of seal housings 190 each having an abutting surface 192 is positioned in abutting relationship with the second abutting end 176 of the corresponding shim 170 and about the shaft 60. Each of the pair of seal housings 190 has a generally "J" configuration. The base of each of the pair of seal housings 190 having the "J" configuration is made up partially by the abutting surface 192 and a short leg 194 extends axially from the abutting surface 192 a preestablished distance being sufficient to house therein a first seal member 196, which in this application is a portion of a dual cone seal. A long leg 198 extends from the abutting surface 192 a preestablished distance being greater in length than that of the short leg 194 and is spaced from the short leg 192 a preestablished distance. Positioned at an opposite end of the abutting surface 192 on the long leg 198 is a bearing end 200. A pair of inner bearing races 210 are positioned about the shaft 60. Each of the pair of inner bearing races 210 has an end 212 in abutment with the corresponding bearing end 200 of the pair of seal housings 190.

Positioned in the first bearing portion 116 of the inner cylindrical peripheral surface 104 of the inner cylindrical housing 100 is a bearing and outer race assembly 216. An end 218 of the bearing and outer race assembly 216 is in abutment with the vertical portion 128 of the first bearing surface 116. A second sealing member 220, being another portion of a dual cone seal is sealingly adapted to sealingly operate with the first sealing member 196, is positioned in the sealing portion 114 of the inner cylindrical peripheral surface 104 of the inner cylindrical housing 100. The inner cylindrical housing 100 is positioned about the shaft 60 and a bearing assembly 222 including a bearing and an outer race assembly 224 which is positioned with an end 226 in abutment with the vertical portion 128 of the second bearing surface 120. And, an inner race 228 of the bearing assembly 222 is positioned about the shaft 60 and on the fourth cylindrical surface 70. A washer 230 is positioned about the shaft 60 as is a lock 232 and a nut 234 is threadedly connected to the threaded portion 76 of the shaft 60. The nut 234 abuttedly positions the lock 232, the washer 230, the bearing assembly 222, the bearing and outer race assembly 216, the inner races 210, the seal housing 190 and the shim 170 into engagement with the edges 80 between the first cylindrical surface 64 and the second cylindrical surface 66. Additionally, the first seal member 196 and the second seal member 220 are positioned in sealing relationship. The relationship between the above components, the shaft 60 and the inner cylindrical housing 100 at each end 78 of the shaft 60 is symmetrical and can be duplicated as identified from the above. Positioned at the second end 108 of the inner cylindrical housing 100 of each of the pair of individual shell portions 86 is a cap 240 having a plurality of clearance holes 242 therein corresponding to the plurality of threaded holes 122 positioned in the second end 108 of the inner cylindrical housing 100. A plurality of threaded fasteners 244 sealingly connect the respective cap 240 to the pair of individual shell portions 86. A conventional plug 246 is conventionally positioned in each of the caps 240.

Each of the pair of individual shell portions 86, the first and second seal members 196, 220, the sealing housing, the shim 170, the shaft 60, the cap 240 and the plug 246 have a cavity 250 formed therebetween in which a lubricant 252, such as oil is stored for lubricating the bearing assemblies 216, 222.

Industrial Applicability

Prior to operation, the components of the cushioned rollers 40 and the work machine 10 are assembled. For example, each of the cushioned rollers 40, in the assembled state, is assembled to the chassis 22 and each of the endless belts 14 is positioned about the idler wheel 34 and the drive wheel 30. The conventional tensioning system 32 is actuated and the belted drive system 12 is assembled to the components of the work machine 10.

Prior to assembling the cushioned rollers 40 to the chassis 22, the cushioned roller 40 is assembled. For example, the machined shaft 60 is assembled into the cushioning member 160 which has been positioned within the collar 44. After the shaft 60, collar 44 and cushioning member 160 have been assembled with the shaft 60 centered on the first cylindrical surface 64, the pair of shims 170 are positioned on the shaft 60 with the first abutting end 172 in contacting relationship with the edge 80 between the first cylindrical surface 64 and the pair of second cylindrical surfaces 66. The next operation includes positioning the pair of seal housings 190 on the second cylindrical surface 66 of the shaft 60 with the first seal member 196 assembled in each so that the abutting surface 192 of the pair of seal housing 190 abuts the second abutting end 176 of the pair of shims 170. Next, the pair of inner bearing races 210 are positioned on the third cylindrical portion 68 of the shaft 60 with the end 212 abutting the bearing end 200 of the pair of seal housing 190. The next progression includes assembling each of the pair of individual shell portions 86 being partially assembled on the shaft 60. For example, the pair of individual shell portions 86 have the bearing and outer race assembly 216 assembled within the first bearing surface 116 and the second sealing member 220 is positioned within the sealing portion 114. After the pair of individual shell portions 86 have been positioned about the shaft 60, the bearing assembly 222 is positioned about the fourth cylindrical surface 70 on the shaft 60 and within the second bearing surface 126 of the corresponding one of the pair of individual shell portions 86. The washer 230 is positioned about the shaft 60 as is the lock 232 and the nut 234 is threadedly connected to the threaded portion 76 of the shaft 60. Thus, the nut 234 abuttedly positions the lock 232, the washer 230, the bearing assembly 222, the bearing and outer race assembly 216, the inner races 210, the seal housing 190 and the shim 170 into engagement with the edges 80 between the first cylindrical surface 64 and the second cylindrical surface 66. Additionally, the first seal member 196 and the second seal member 220 are positioned in sealing relationship. The locks 232 are locked about the nut 234 fixedly positioning the nuts 234 to the shaft 60. Individual caps 240 are positioned in sealing relationship to the respective one of the pair of individual shell portions 86 and the plurality of threaded fasteners 244 are threadedly connected in the plurality of threaded holes 122. Lubricant 252 is added to the respective cavity 250 and the plugs 246 are conventionally positioned in each of the caps 240.

The assembly of the cushioned rollers 40 to the chassis 22 can be completed. For example, the plurality of bolts 44 are inserted through the clearance holes 158 and threadedly attached to the threaded holes 50 within the roller frame 42. Thus, the cushioned rollers 40 are attached to the chassis 22 and the pair of endless belts 14 are positioned on the work machine 10.

In operation, the work machine 10 is attached to a work implement such as a chisel plow. The work machine 10 travels across a field which has a plurality of irregularities such as farrows, ditches, hills and sloping contours. During the operation, as various portions of the endless belts 14 contacts the ground, different loads are imputed along the footprint of the belt 14. For example, as the work machine 10 travel along the ground the portion of the belt 14 suspended between the idler wheel 34 and the drive wheel 30 may or may not be totally in contact with the ground depending on the configuration of the contour. At some point of the travel either the inner portion 18 and/or the outer portion 20 of the belt 14 will be in contact with the ground. The roller 40 interposed the idler wheel 34 and the drive wheel 30 support a portion of the load transmitted from the belt 14 to the work machine 10. If the load transmitted from the belt is not uniform, such as at either the inner portion 18 or the outer portion 20, which is more the rule than the exception due to the contour of the ground, one of the pair of individual shell portions 86 will receive a greater portion of the load than will the other one of the pair of individual shell portions 86 of the same roller 40. Thus, the cushioned roller 40 will compensate for at least a portion of the non-uniform loading. The shaft 60 will pivot axially along the axis 62 about the roller frame 42. The end result will provided several advantages: 1) a larger footprint of the belt 40 will be provided to the ground; 2) the bending force transferred near the ends 78 of the shaft 60 will be reduced since the load will be better distributed along the axially length of the shaft 60; and 3) the compaction along the footprint of the belt 40 will be better equalized.

Thus, the cushioned rollers 40 more effectively and efficiently allow the endless belt 14 to operate. The structural integrity of the cushioned rollers 40 reduces impact stress. And, the pivotal function of the cushioned rollers 40 provides a better more equal compaction along the footprint of the endless belt 14. Furthermore, the cushioned rollers 40 provides longer life for the components of the work machine 10 by dampening the impact loads transmitted to the work machine.

I claim:

1. A work machine having a rubber belted track system, said rubber belted track system being attached to a chassis of said work machine and said rubber belted track system having a pair of endless belts defining an inner surface having an inner portion and an outer portion, said pair of endless belts being driven by a drive wheel and an idler wheel being connected to said chassis, said pair of endless belts being tensioned between said drive wheel and said idler wheel by a tensioning means, said work vehicle comprising:

a plurality of cushioned rollers being attached to said chassis and rotatably contacting the inner surface of said pair of endless belts;

said plurality of cushioned rollers including a shaft defining an axis, a pair of ends being spaced along said axis and a cylindrical surface being axially centered on said shaft;

said plurality of cushioned rollers including a pair of individual shell portions rotatably attached near each of the ends of the shaft and being separated by said cylindrical surface, individual ones of said pair of individual shell portion being in contacting relationship with at least one of said inner portion and said outer portion of the inner surface of the pair of endless belts;

a collar being positioned about said cylindrical surface and being attached to said chassis; and a cushioning member being interposed said collar and said cylindrical surface of said shaft.

2. The cushioned roller of claim 1 wherein said shaft, said collar and said cushioning member are substantially nonrotatable.

3. The cushioned roller of claim 2 wherein said cushioning member is compressively positioned between said shaft and said collar.

4. The cushioned roller of claim 3 wherein said cushioning member is rubber.

5. The cushioned roller of claim 1 wherein each of said pair of individual shell portions defines an outer peripheral surface having a an elastomeric material attached thereto.

6. The work vehicle of claim 1 wherein said chassis includes a roller frame and said pair of individual shell portions straddle said roller frame.

7. The work vehicle of claim 6 wherein said axis of said shaft can oscillate about said roller frame.

8. The work vehicle of claim 7 wherein said axis of said shaft can osculate about said roller frame in an arc of about 5 degrees.

9. The work vehicle of claim 1 wherein said plurality of cushioned roller defines a cavity in which a lubricant is positioned.

10. The cushioned roller of claim 9 wherein said lubricant is retained by a seal member.

11. The cushioned roller of claim 10 wherein said seal member is a dual cone seal.

12. The work vehicle of claim 9 wherein said lubricant is oil.

13. The work vehicle of claim 9 wherein said cavity has an access thereto for replacing said lubricant.

14. The work vehicle of claim 1 wherein said plurality of cushioned rollers are removably attached to the roller frame by a plurality of fasteners.

15. The work vehicle of claim 1 wherein said plurality of cushioned rollers define an outer peripheral surface and an elastomeric material is attached to said outer peripheral surface.

16. A work machine having a rubber belted track system, said rubber belted track system being attached to a chassis of said work machine and said rubber belted track system defining an inner surface, said rubber belted track system being driven by a drive wheel and an idler wheel being connected to said chassis, said rubber belted track system being tensioned between said drive wheel and said idler wheel, said work vehicle comprising:

a plurality of cushioned rollers being attached to said chassis and rotatably contacting the inner surface of said rubber belted track system;

said plurality of cushioned rollers including a shaft defining an axis, a pair of ends being spaced along said axis and a cylindrical surface being axially centered on said shaft;

said plurality of cushioned rollers including a pair of individual shell portions rotatably attached near each of the ends of the shaft and being separated by said cylindrical surface, individual ones of said pair of individual shell portion being in contacting relationship with the inner surface of the rubber belted track system;

a collar being positioned about said cylindrical surface and being attached to said chassis; and a cushioning member being interposed said collar and said cylindrical surface of said shaft.

* * * * *